United States Patent [19]
Tornabene

[11] 3,930,168
[45] Dec. 30, 1975

[54] WAVE-ACTION POWER APPARATUS

[76] Inventor: Michael G. Tornabene, 462 - 7th Ave., New York, N.Y. 10018

[22] Filed: Apr. 1, 1974

[21] Appl. No.: 457,075

Related U.S. Application Data

[63] Continuation-in-part of Ser. No. 428,349, Dec. 26, 1973, and a continuation-in-part of Ser. No. 432,211, Jan. 10, 1974.

[52] U.S. Cl.................................. 290/53; 417/331
[51] Int. Cl.² ......................................... F03B 13/10
[58] Field of Search .................. 290/42, 43, 53, 54; 417/330, 331, 332, 333, 334

[56] References Cited
UNITED STATES PATENTS

| | | | |
|---|---|---|---|
| 953,600 | 3/1910 | Edens | 417/333 |
| 961,401 | 6/1910 | Bonney | 417/331 |
| 975,157 | 11/1910 | Quedens | 290/42 |
| 1,393,472 | 10/1921 | Williams | 290/42 |
| 1,396,580 | 11/1921 | Kilcullen | 417/333 |
| 1,864,499 | 6/1932 | Grigsby | 290/42 |
| 3,394,658 | 7/1968 | Johnson | 417/333 |
| 3,808,445 | 4/1974 | Bailey | 290/53 |

*Primary Examiner*—Robert K. Schaefer
*Assistant Examiner*—John W. Redman

[57] ABSTRACT

In a preferred embodiment of the invention, there is provided a double-action piston water pump of elongated shape with the piston supported on a lever rod extending coaxially to the piston chamber and extending through both ends of the cylinder providing thereby equal volume displacement constantly throughout the cylinder inner space irrespective of the position of the piston during the to and fro strokes, with there being mounted on a lower end of the lever rod a float element revolvable around the lever rod with the lever rod as a central axis thereto and with there being detachably mounted on the float element an additional dense mass for varying the depth that the float element sits in the water and varying momentum and inertia during a stroke, the float element including separable and dismountable upper and lower halves and including bearing mountings of the upper and lower halves with a lubrication port and channel for pressurized lubrication of the bearing mountings, and there also being included in closed flow cycle inlet and outlet conduits to and from the opposite ends of the piston cylinder with appropriate one-way valves therein and mounted within the conduit cycle there being a turbine propelled by the pumped fluid such as pumped water, the cylinder and the conduits and the turbine being arranged relative to one-another to obtain a substantially unbroken circle of flow for accentuating fly-wheel-like inertia and momentum of the circularly flowing water, there also being an additional mass body mounted on a lower end of the lever rod having a stabilizing effect against distorting torques on the lever rod, the revolving float element also reducing any such distorting torque effects also, the rod lever being slidably supported by two bearing mountings located both above the upper extremity of the upward stroke of the lever rod responsive to the crest of a wave pushing upwardly on the float element.

22 Claims, 13 Drawing Figures

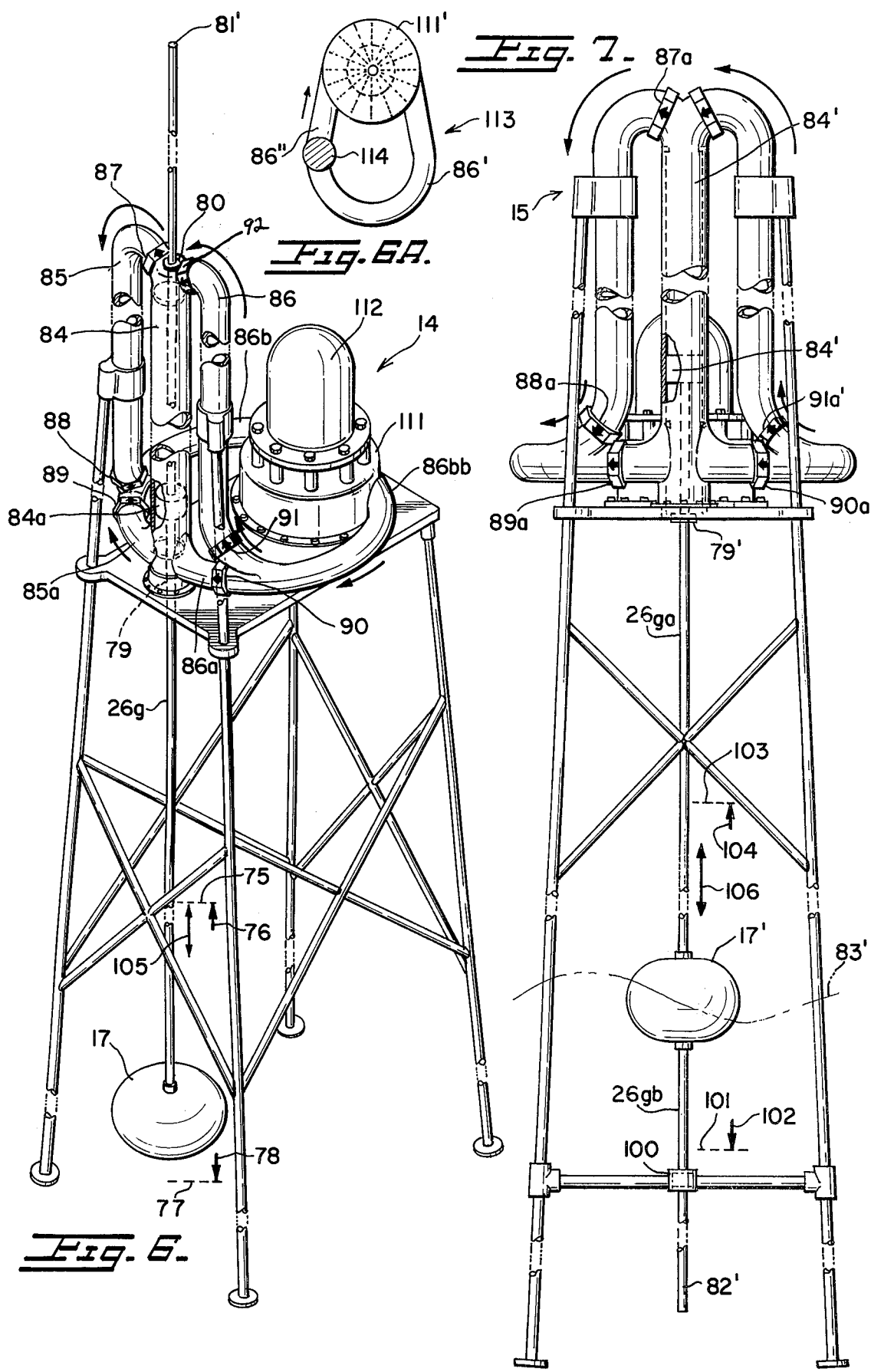

WAVE-ACTION POWER APPARATUS

This invention relates to improved wave-action energy-harnessing apparatus utilizing a float reciprocatable upwardly and downwardly with wave motion between waves' crests and troughs, and is a continuation-in-part of the first filed parent application Ser. No. 428,349, filed Dec. 26, 1973, entitled A WAVE-ACTION POWER CONVERSION APPARATUS and of the second filed and continuation-in-part parent application Ser. No. 432,211, filed Jan. 10, 1974, entitled IMPROVED WAVE-ACTION POWER APPARATUS the disclosures of both of which prior parent applications are hereby incorporated by reference in their entirety hereinto this present continuation-in-part application which in-part constitutes inventive improvements over the preceding applications.

BACKGROUND TO THE INVENTION

Prior patents existing on this subject which might have some semblance of resemblance to the functioning of the present invention may be divided into two general groups, one in which a float is responsive to alternating variations in tide rather than the intermittent wave action, and the second group in which the response of the apparatus is to individual wave action and not to any significant degree to variations in tide. Patents relating to tidal variations include U.S. patents such as the Kriegel U.S. Pat. No. 3,487,228 and the Kammerer U.S. Pat. No. 3,515,889, and the Dontelli U.S. Pat. 3,746,875, and the Vrana U.S. Pat. No. 3,668,412, and the Lord U.S. Pat. No. 3,567,953, and and it should be noted that the present invention does not relate to this type of mechanism or function. In contrast thereto, the Johnson U.S. Pat. No. 3,394,658 relates to wave action but plagued with some of the problems to which the present invention is directed to overcome, namely a binding of the float 70 structure 78 and attached shaft 84 against each of the base anchoring pipe 10 and the fixed slotted stationary structure 80 which is fixedly attached to the main elevated pump structure 22, 28, and the like of that patent. It should be moreover noted with that patent that the slotted pipe 10 of the Johnson patent would be subject to extremely great torques as a result of violent wave and current action on the float from time to time and that the slotted pipe 10 could be expected to bend or shear. The Stanziola U.S. Pat. No. 3,697,764 at most discloses float 30 unitary with shaft 32 one fixedly attached to the other, accompanied with the main problems of binding of the shaft responsive to twisting and/or lateral torques resulting from wave and current actions on the float 30 of that patent. In the Richeson U.S. Pat. No. 3,758,788, the spherical pendulum member 46 thereof serves no function as a float, but in fact is contrary to the spirit of the present invention in that the pendulum 46 is intended to bring about a rock motion of the respective interconnected platforms 50 with their respective pump cylinders 21, and accordion-like compression members 38, operating by a mechanism totally contrary to and unrelated to that of the present invention and of the preceding patents.

Additionally, none of the prior art known to the inventor relates to other novel and advantageous inventive improvements of the present invention.

SUMMARY OF THE INVENTION

Accordingly, an object of the present invention is to obtain a wave-action energy-harnessing float apparatus unimpaired in its routine operation and durable against destructive and thwarting forces of twisting and turbulent water currents and waves.

Another object is to obtain further improvements on the effectiveness of added dence mass for momemtum and inertia, together with the other advantages associated therewith such as stability improved center of gravity lessoning torque on lever bearing and structure.

Another object is to obtain a novel pump construction for minimizing energy waste and for maximizing pump efficiency, particularly for a wave-action energy-conversion apparatus.

Another object is to obtain an improved bearing-support structure for an axially reciprocatable lever of a wave-energy conversion float structure.

Another object is to obtain a novel float structure with diverse advantages such as variable mass, improved responsiveness to wave actions and currents, and the like, together with reduced torque and/or maximized lever strokes.

Other objects become apparent from the preceding and following disclosure.

One or more objects of the present invention are obtained by the invention as defined herein.

Broadly the invention may be described as a wave-responsive float and lever mechanism in which the float is rotatably mounted relative to the lever on which it is mounted such that the forces of water of waves and current are at least partially absorbed by the free-revolving motion of the float thereby substantially obviating forces on the lever which might otherwise bind the lever against free reciprocatable motion upwardwardly and downwardly within its bearing supports. Also, the float is preferably of a size obtaining increased water-displacement capacity together with a dense mass associated therewith offset by the high degree of water displacement volume of the float, while the dense mass enhances the advantages set forth in an earlier application with regard to inertia and momentum thereof in the maximizing of each of uppward and downward strokes responsive to variations in height of the float as between crests and troughs of consecutive waves. Differences in locations and/or differences in the time of the year make for considerable differences in the nature of the waves with regard to their intensity height, turbulence, and the like, and accordingly the additional large amount of mass above that normally associated with the normal conventional structure of a float, is preferably detachably mounted and mountable in varying quantities. In particular situations, it is more desirable that the mass be associated directly with the float in order to obtain the maximum control over the ease of revolving thereof around the reciprocatable shaft around which it is mounted, as well as the varying of the mass thereof to otherwise stabilize the float against movements that might otherwise impart undesirable torque to the lever on which the float is revolvably mounted, and as well as for causing the float to be stably seated at any of predetermined depths within the water when floating at equilibrium on the surface thereof and/or for sinking the float far below the surface of the water during such times as when violent storms might otherwise serve to destroy the entire apparatus by force greater than those for which the apparatus was designed to withstand leverage of turbulent waters against a float located on the surface of the water. Also in accordance with the above objects, the length of the uninhibited maximum stroke is maximized by having the mounting bearings for slidably mounting the reciprocatable float-supporting shaft upwardly and downwardly axially, mounted at points well beyond the maximum possible stroke under normal conditions. The particular location of the supporting bearing supports for supporting the lever slidably or movably otherwise to and fro upwardly and downwardly reciprocatably, and preferred for some particular conditions at one particular location, while for other different particular conditions the preferred location may be substantially the opposite. For example, in one embodiment, it is preferred that there be no bearing support beneath the float, but that both bearing supports of the lever be located well elevated above the float, such as one at the platform level and one at the peak of the dome above the platform. In contrast, in another embodiment the bearing supports are located one above the float and one mounted below the float, mounted securely in the undersea-bottom earth or structure embedded fixedly therein immovably, with there being provided extending axially downwardly from the upwardly and downwardly reciprocatable float-mounting shaft, sufficient free downwardly-extending space for providing room for the axial movement of the end of the shaft in its maximum downward stroke toward and into the seabottom bearing structure into that space. The criteria of which guidance as to which system might be preferred for a particular situation relates to the magnitude of forces to which the float and float-supporting reciprocatable lever will be subjected, and accordingly to the binding forces which might otherwise interfere with upward and downward reciprocation axially of the float-supporting lever within the lever bearing supports. For turbulent tides and currents and waves of a large magnitude, the lower seabottom bearing support together with the upper elevated bearing support would be preferred, whereas for less severe conditions, the existence of both the upper and lower bearing supports well above the float as a part of the platform and dome respectively, would prove entirely satisfactory while concurrently providing the above-noted advantage of adequate room for reciprocation of the float throughout its maximum upward and downward strokes. Additionally, a major advantage of the present invention and embodiment thereof is a preferred fluid-pump preferably for the pumping of water or other liquid as might be desired and/or conventional, in which the pump preferably is of a double-action piston-pump variety preferably having the piston shaft extending throughout the length of the double-action piston cylinder coaxially therewith, for effecting constant and equivalent volume displacement within the cylinder throughout its length irrespective of the location of the piston in to and fro movements thereof. In the pump improvement embodiment improvement of the invention, a further improvement therein includes a preferred substantially annular flow path such as preferably circular, for moving water in conduits to and from the pump cylinder and to and from a turbine from and to which the conduits extend and are interconnected operatively, providing thereby for a substantially continuous liquid flow of the water through the conduits to and away from the turbine and to and from the pump cylinder, and thus effecting a maximum benefit of the momentum of the moving water in thereby avoiding bends and/or turns and, to the extent possible, avoiding the stopping and starting of intermittent movement of large volumes of water which starting and stopping would dissipate energy otherwise available to effect useful harnessed energy, in the production of electricity by a generator connected to the turbine conventionally. Other preferred improvements of the invention relate to a preferred construction of the rotatable float as well as a pressurized lubrication system therefor to cope with the corrosive and sea-trash clogging effects of forces to which the rotatable float is subjected on the bearing by which the float is mounted on the lever shaft. It is also preferred in other situations to have the additional mass removably mountable on the lever itself, as opposed to on the float. In some situations, as for example the types discussed above, the preferred location for the extra mass is above the float, while in other situations or environmentments, the additional mass may be preferred on the lever below the float, while in other situations it might be desired both above and below the float, while in other situations it might be desirable for the additional mass to be a part of the float as well as above and/or below the float on the lever. The particular environment in so far as depth of the water, normal turbulence, the type of wave, the extent of currents and types thereof, and other associated wave factors being the determinants of the preferred embodiment to be utilized, as optimum for that particular situation. Other preferred and desired features will be noted in the Figures below described, and in the detailed description.

THE FIGURES

Figure 5:
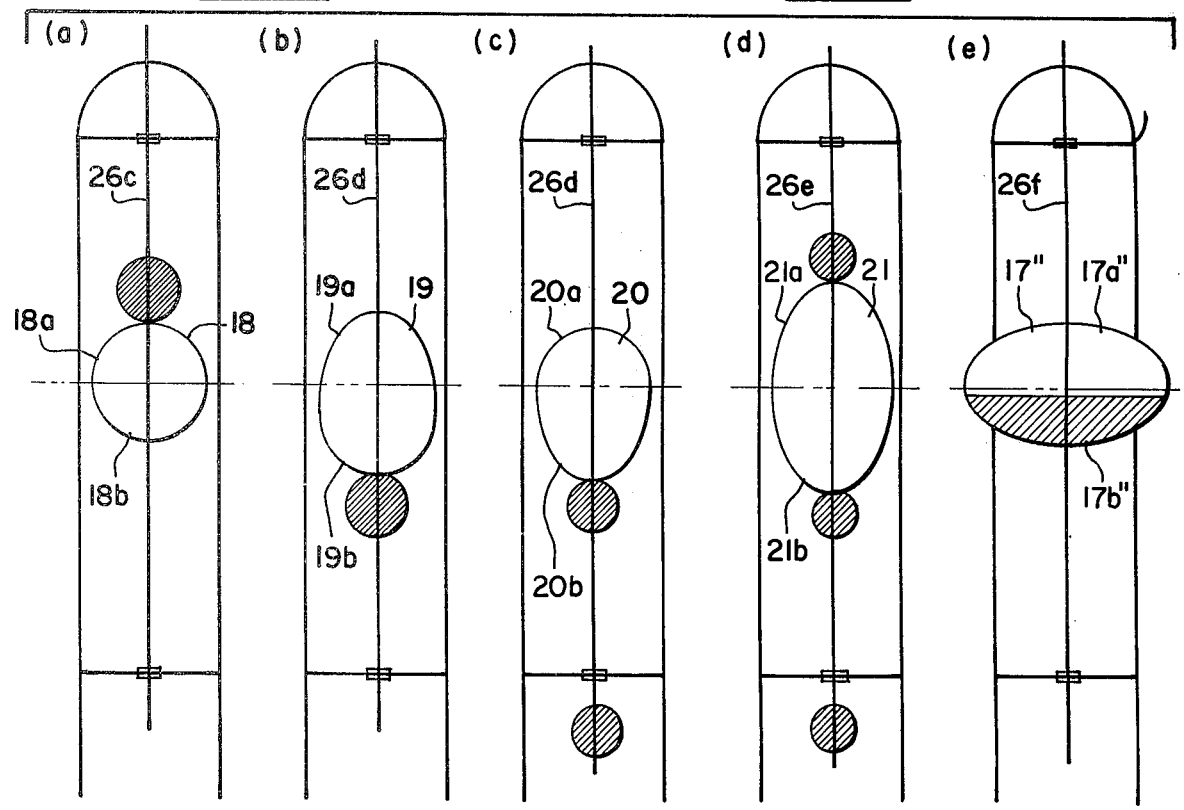

FIG. 5 illustrates in embodiments (a) through (e) typical variations in the locations of additional mass -- shown in darkened cross-sectional type representation, relative to the float shown in mere outline thereof, and in variations in shapes of the float as would have different properties and characteristics with regard to the lever shaft on which it or they are mounted, the overall support structure, the lever shaft and lever support bearings and the additional mass(es) and the float all being shown merely diagrammatically in side view.

FIG. 6 illustrates a particular preferred embodiment of the invention in perspective side view, together with illustrating an embodiment devoid of a lever extension below the float, and with both lever support bearing structures located well above the upper extremity of the upward stroke movement of the float.

FIG. 7 illustrates an elevation side view of an alternate embodiment to that of FIG. 6, this embodiment being devoid of an upper extension above the piston within the piston cylinder and additionally including a lower lever extension and a lower lever support bearing below the float.

Figure 8:
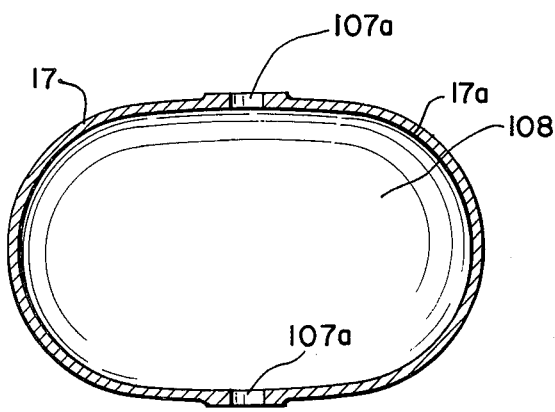
Figure 9:
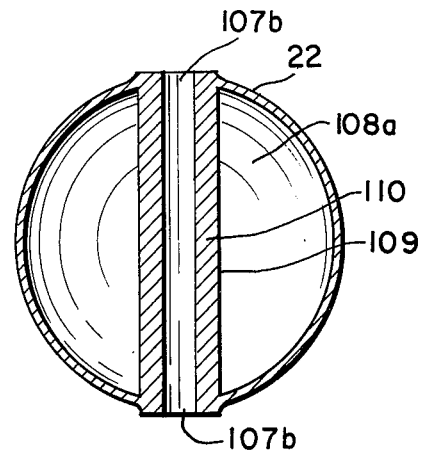

FIG. 8 illustrates in cross-sectional view a float which for some particular conditions would be preferred because of this embodiment having been found to respond quickly to small wave height differences, this being the embodiments of float illustrated in each of FIGS. 6 and 7, and in the general shape of the FIG. 5 embodiment (e) thereof.

FIGS. 9 through 12 illustrate variations on additional mass distribution as desired for varying conditions encountered in different environmental situations, for optimizing the particular environmental conditions at which the total apparatus is to be located.

FIG. 6A illustrates diagrammatically the substantially circular cyclic flow path typical of those of FIGS. 6 and 7 embodiments.

DETAILED DESCRIPTION OF THE INVENTION

Figure 1:
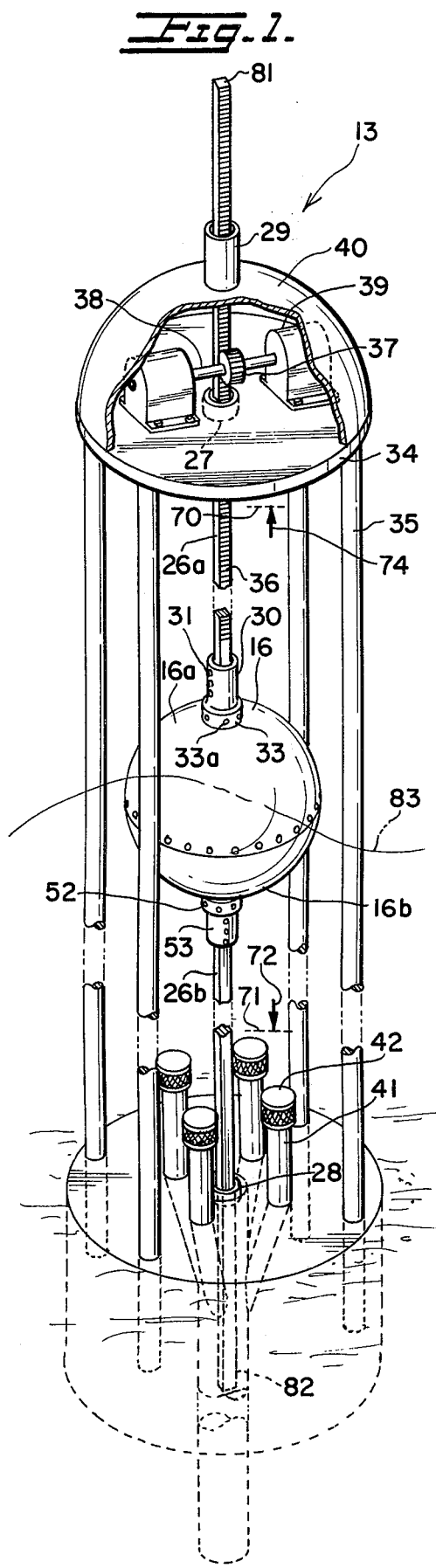
FIG. 1 illustrates a side perspective view of a typical embodiment of the present invention, together with preferred improvements being illustrated as a part thereof.
Figure 2:
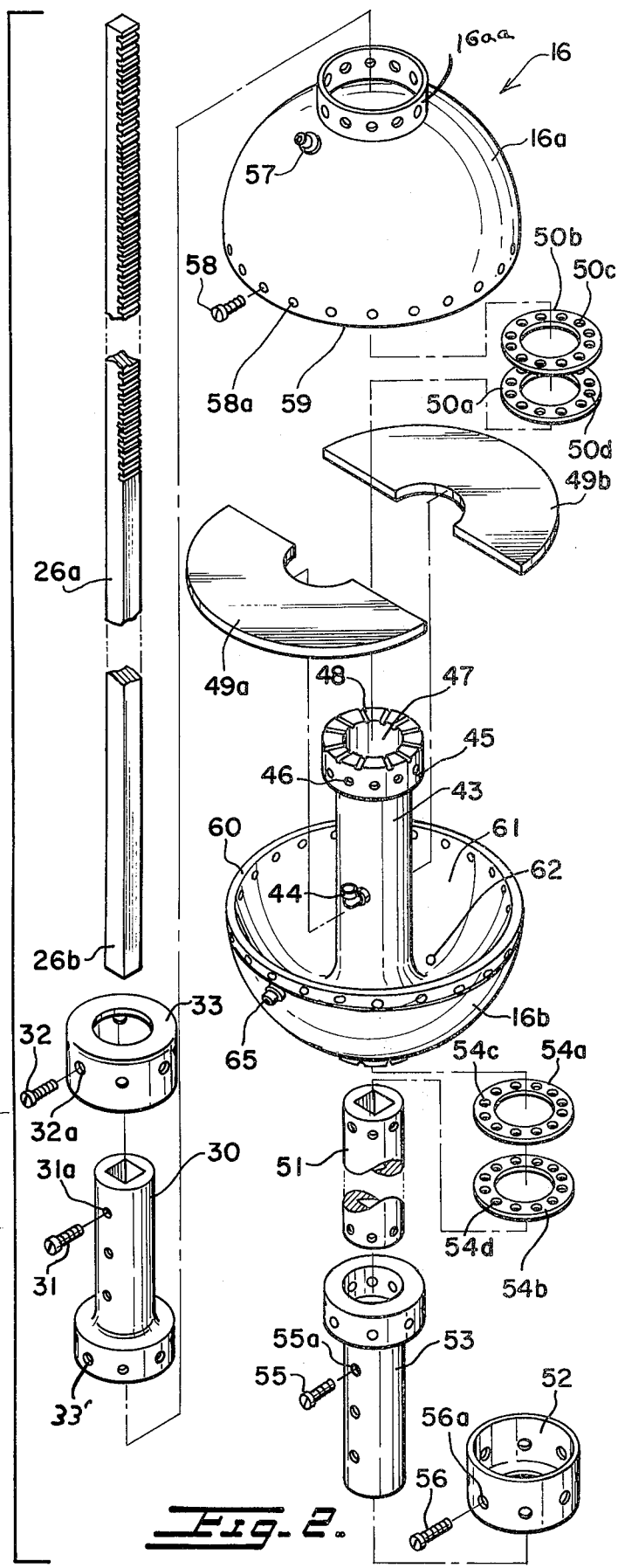
FIG. 2 illustrates in an exploded perspective view in side view, a preferred float structure combination.
Figure 3:
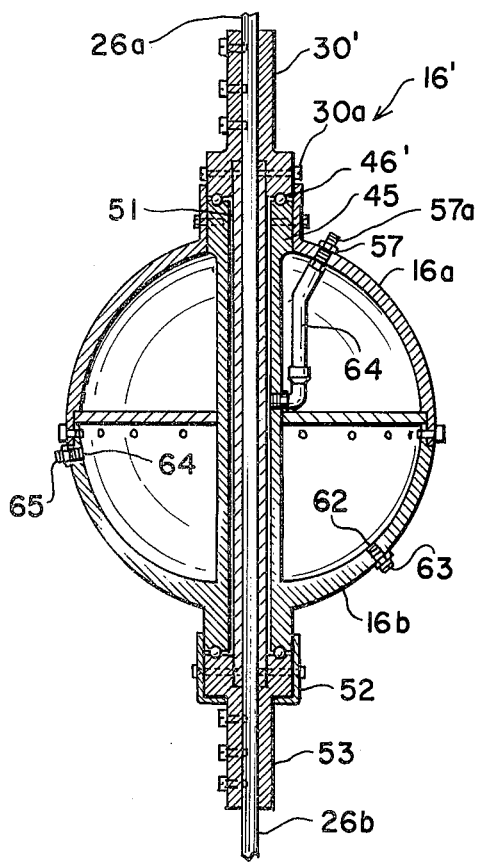
FIG. 3 illustrates in side view cross-section an alternate embodiment of FIG. 2, in an assemble state.

In greater detail, FIG. 1 illustrates one particular preferred embodiment of the invention, illustrating a ratchet type drive mechanism combination 13, while FIG. 6 is a piston type pump apparatus and FIG. 7 illustrates a variation as another embodiment 15 of a pump type for wave-energy harnessing. Accordingly, FIG. 1 illustrates a spherical float 16 having upper portion 16a and lower portion 16b, and FIG. 2 illustrates in exploded view for the apparatus 16, while FIG. 3 illustrates basically the same type of embodiment of that of FIGS. 1 and 2 in an assembled state in cross-sectional view except for a minor difference in an upper bearing clamp and bearing, the FIG. 3 embodiment having the same type float upper sphere half 16a and lower sphere half 16b, while FIG. 6 illustrates a spheroid of type 17 and FIG. 7 illustrates a somewhat similar shaped spheroid 17'. In the various shapes of floats illustrated in FIGS. 5(a) through 5(e), there is illustrated in the embodiment 5(e) a somewhat similar embodiment 17'' having upper portion 17''a and lower portion 17'' b, illustrated diagrammatically. The embodiments of FIGS. 5(a) through 5(d) illustrate still differently shaped variations such as the round shape of embodiment 5(a) of true sphere 18 with upper portion 18a and lower portion 18b, and the embodiment 5(b) having an egg-shaped spheroid 19 with the small upper portion 19a and large lower portion 19b, and the 5(c) embodiment 20 having the enlarged upper half 20a and small lower half 20b, and the 5(d) embodiment 21 having the oval shape of equal sized small upper half 21a and small lower half 21b. The embodiment of 5(e) is spheroid shaped but of greater diameter than height, as contrasted to the (d) embodiment having a greater height than diameter.

Making further reference to the embodiments of FIGS. 1 and 2, FIG. 2 is an exploded view of the novel rotatable float 16 of FIG. 1 and its associated lever shaft on which it is rotatably mounted. Accordingly, FIG. 1 embodiment 13 illustrates the float sphere 16 mounted by mounting screw 31 on the upper lever portion 26a by the circumscribing portion 30 having portion 33 mounted thereon, in which is rotatable the portion 16aa (of 16a) secured to the FIG. 2 central member 43 by lock screws 33a locking into the screw holes 33' of portion 30 in FIG. 2 for thereby locking downwardly the upper half sphere 16a which is locked by appropriate screws 58 through screw holes 58a to the lower half 16b. Accordingly, the edge 59 is flush with the edge 60 of the upper and lower halves respectively. In like manner, the annular cap 52 is locked onto the lower half around the member 53 which is locked onto the shaft lower portion 26b. The shaft lower portion 26b is reciprocatable within the sealed cylinder 28 extending downwardly into the seabottom having flow vents with filters 42 for permitting flow inwardly and outwardly of water as water is displaced within the cylinder by the shaft end 82 as it reciprocates inwardly and outwardly thereinto. Typical water level in which the float 16 is floating is illustrated by water level 83. The upper portion of the shaft identified as portion 26a reciprocates through upper bearing portion 27 and through portion 29 which optionally may or may not be also a bearing support surface, the shaft end 81 extending through the portion 29 for free to and fro axial movement uninhibited for maximum axial movement as the float 16 is fully responsive to variations between crests and troughs of consecutive waves. The platform 34 is mounted on support 35 and includes generator 39 and cover 40.

Figure 4:
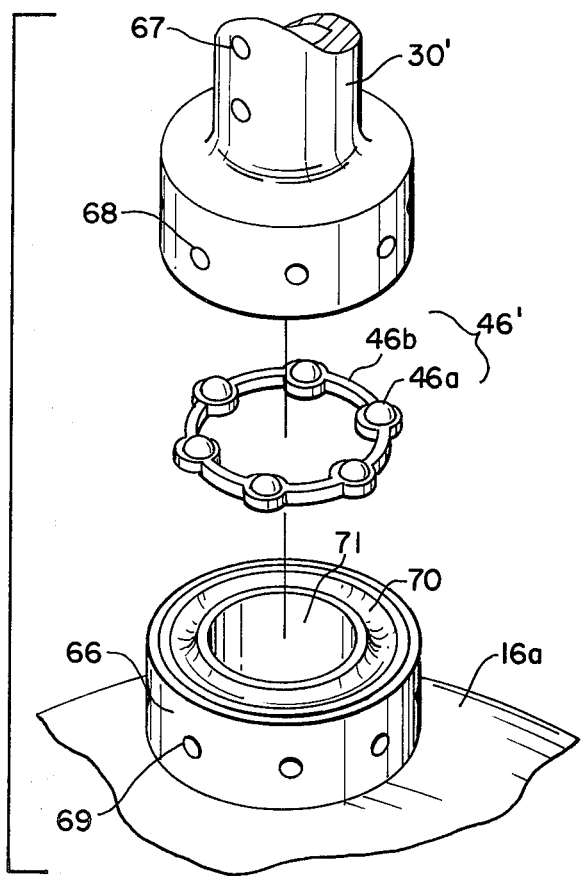
FIG. 4 illustrates in an in-part and exploded view an alternate bearing structure combination, showing the upper end of the float and a lower end of the upper lever portion.

FIG. 2 better illustrates the screw 32 and insertion hole 32a, screw 31 and insertion hole 31a, the shaft locking member 51 with its respective aligned holes, screw 55 and its hole 55a, screw 56, and its aligned hole 56a of member 52, and the partitioning bilateral member composed of halves 49a and 49b for partitioning the upper and lower chambers from one-another of the float 16 whereby for example closed-cell foam such as polyurethane foam may be injected into the upper portion without filling the lower portion and thereafter this permits the lower chamber to be totally hollow for the optional intermittent admission to and exclusion from the lower space mass such as water when it is desired to lower the float in it seating level afloat in the water or when it is desired to sink the float altogether. Also illustrated in FIG. 2 are typical bearing rings which slidably are mounted and move one on top of the other and are lubricated by pressurized forced lubricant with the lubricant injection point 57 into the inner channel (as more aptly shown in the FIG. 3 illustration) by the conduit 44 leading into the body 43. The inlets and outlets 65 and 62 to space 61 of the lower half 16b include appropriate lock members for the sealing thereof as lock member 64 illustrated in FIG. 3 embodiment. As noted above, the FIG. 3 embodiment is basically the same as that of the embodiment of FIG. 2 except for the FIG. 3 differing bearing combination of FIG. 4 embodying the bearings 46' and the element 30' locked on top of the bearings 46', the bearings being a series of bearings 46a held in the ring 46b and seated in the member 66 lower groove 70 and a corresponding upper groove (not illustrated) of member 30'. Lubrication is forced upwardly through the space 71 around the member 51 illustrated in FIG. 3. The inlet aperture 57 is closed by the closure member 57a for the insertion of the lubricant under pressure; preferably the air pressure would be relieved before the injection of solid lubricant into the injection inlet 57, and after injection under pressure of a substantial portion, the valve member preferably would be screwed into port 57 such as insertion member 57a which preferably would contain a conventional type air-inlet valve as a part thereof, and air pressure would then be forced into the tube through the valve member 57a to thereby establish pressure within the conduit 64 for the lubricant at all times.

Within the member 30' are appropriate screw holes 67 and 68 for corresponding screws therefor; similarly there are appropriate screw holes in member as holes 69.

In FIG. 5, the five different embodiments illustrate graphically different support structures with the float and additional mass for additional benefit of momentum and inertia, mounted at different pts. along the reciprocatable shaft, and/or associated with the float itself within the 5(e) embodiment. As is seen by reference to the embodiment 5(a), there is illustrated the extra mass above the float, and in embodiment 5(b) the mass below the float, and in embodiment 5(c) the mass below the float as well as additional mass on the lever below the lower support bearing, and in the embodiment 5(d) there additionally being mass above the float on the lever, as well as below the float on the lever and also below the lower bearing on the lever. The embodiment 5(a) has the advantage of not displacing water on downward movement until the last instant in the latter part of the stroke to thereby maximize the length of the downward stroke as maximized by inertia of the mass. However, in the embodiment 5(b), because the extra mass is below the float, the additional displacement of water serves to maximize the length of the upward stroke by virtue of the additional buoyancy after the downward surging stroke has float and the additional mass below the equilibrium flotation point. Also, for each of the embodiments of 5(b) and 5(c), the lower masses serve to increase the stability and decrease the tendency to bind the shaft within the upper and lower bearings, this being particularly true for the 5(c) embodiment. In the 5(d) embodiment, there would be some of the benefits of each of the embodiments of 5(a), 5(b) and 5(c). In like manner, when the float is enlarged on its lower half as in the embodiment 5(b), the effect on the float for the revolving thereof as in the embodiment 5(e) would be greater than in the embodiment such as the embodiment 5(c). However, for the embodiments 5(b) and 5(e), the greater diameters of the lower halves serve to limit the downward surge in depth of the stroke resulting from momentum of the total mass with its inertia, whereas the embodiment 5(d) shape of float maximizes the stroke downward plunge, but would be less responsive to revolving sensitivity to water current(s) acting on the surface of the float. Thus where the water currents are of a turbulent nature as might cause substantial torque on the shaft on which the float is mounted to prevent ready sliding past the bearing supports to and fro, the embodiment of 5c lever 26d and float 20 would be preferred. In contrast, for rising and falling waves substantially devoid of substantial currents or turbulence, the lever shaft 26F of 5(e) and the float 17'' thereof would be preferred and satisfactory. Accordingly, dependent upon the wave and current environmental characteristics, such as those noted above as well as many other factors not specifically itemized, the amount of inertia additional mass employed and/or the shape of the sphere is selected to fit the particular condition(s) to be encountered for a particular environment. In the embodiment of FIG. 6, the bearings are located and the bearing supports 79 and 80 for lever 26g having float 17 mounted thereon. The range of the stroke is to point 75 in upward direction 76 and point 77 in downward direction 78, as contrasted for example to FIG.1 where it is illustrated that the stroke might range to position 70 in upward stroke 74 to position 71 in downward stroke 73. In the embodiment of FIG. 7, the stroke might range from position 103 in upward stroke 104 to downward position 101 in downward stroke 102. In FIG. 6, the reciprocation is in each of opposite directions 105, and in FIG. 7 the reciprocation is in each of opposite directions 106. In FIG. 7, as contrasted to FIG. 6, the FIG. 7 bearing support located at 79' as the upper support and at 100 as the lower bearing support for the lower extension 82' is in contrast to the FIG. 6 which does not have a lower extension nor a lower bearing support but has the upper bearing support 80 for the extension 81'.

In the embodiment of FIG. 6, there is in particular illustrated a double-action piston cylinder 84 and its piston 84a, with appropriate one-way valves 87, 88, 89, 90, and 91, 92. The inlet and outlet conduits 85, 86, 85a, 86a are connected with the conduits 86b and 86bb in cyclic closed series with the turbine 111 and its generator thereof 112, in a preferred embodiment configuration 113 of FIG. 6A having corresponding conduits 86' and 86'' and pump 114 and turbine 111', are in a substantially circular flow shape-arrangement with the substantially circularly shaped and arranged conduits thereof such as 86' and 86''. This arrangement is in fact that illustrated in perspective for each of the embodiments of FIGS. 6 and 7 respectively. The one-way valves of the embodiments of these FIGS. 6 and 7, as well as the other parts not specifically discussed are self-evident from the nature of the illustrations. Other parts and/or numerals not specifically pointed out nor discussed in the various embodiments, correspond to the corresponding numbers except differing in the modifier, such as 17, 17', and 17'', for example, and the like. It would be redundant to repeat mere corresponding structures, or other conventional structure recognized as such by its nature.

Figure 10:
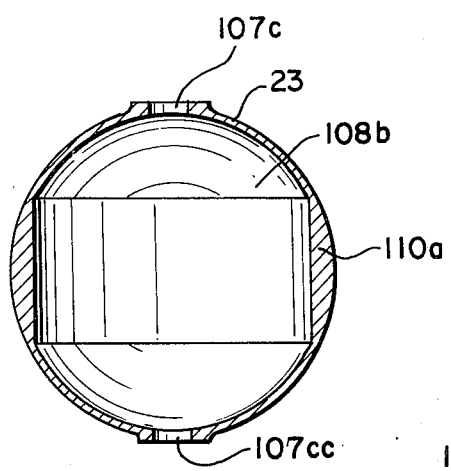
Figure 11:
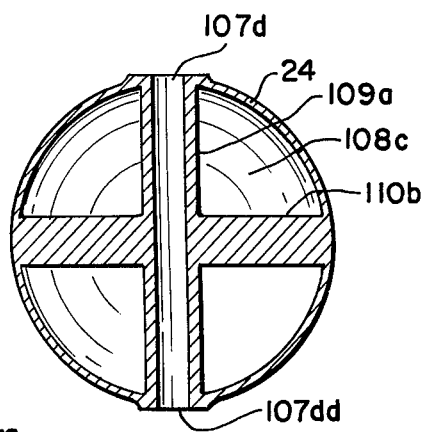

In the FIG. 8, there is illustrated an embodiment of a float 17, typically of the type illustrated in the FIG. 5(e), except that the FIG. 8 additional mass is embodied in the abnormal greater thickness of the walls of the sphere as walls 17a. The upper and lower apertures are identified as 107a and 107aa. The embodiment of FIG. 9 differs in having the additional mass substantially coaxial with the lever shaft and near the center of the radius vertex portion of the float 22, with the additional mass 110 being a part of the annular tube 109. The FIG. 8 defines space 108, whereas FIG. 9 defines space 108a, whereas FIG. 10 defines space 108b, and FIG. 11 defines space 108c, and FIG. 12 defines space 108d. FIG. 10 illustrates sphere 23 differing in the additional mass being present in the periphery centrally about half way between the top 107c and the bottom 107cc ports, as additional mass 110a. In the embodiment of FIG. 11, the additional mass is 110b of the sphere 24, mounted also about half-way between the ports 107d and 107dd. In this embodiment, there is illustrated as included also a central tube 109a.

Figure 12:
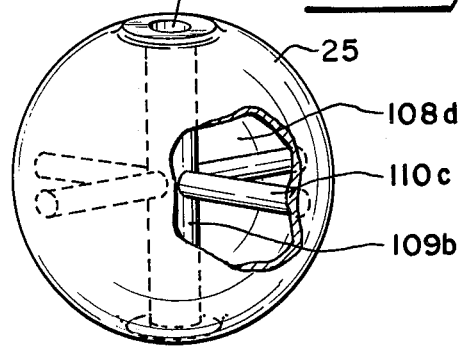

FIG. 12 is somewhat similar to that of FIG. 11, except that the mass 110c is intermittent as radially extending bars from the tube 109b.

It is to be understood that there may be employed as with the parent application, flywheel means for maintaining constant momentum of generator shafts and means for automatic disengagement of conventional types for situations where there might otherwise be excessive peaks of performance. It is also contemplated there may be counter-hydraulic mechanisms of known and/or conventional types such that upon the occuring of excessive rotation speed, the hydraulic or other counter-mechanism would be thrown into action to brake the speed to prevent excessive speeds of rotation which might otherwise tend to be destructive of the apparatus.

Reference is made to the FIG. 2 embodiment 16 of the sphere and the mechanism thereof, to note that the member 45 includes radially extending grooves 48 whereby the pressurized lubricant from the space 47 is forced outwardly onto and between the plates 50a and 50c, with similar grooves (not shown) at the bottom of the plate 16b for lubricating the rings 54a and 54b, and the holes 50c and 50d and 54c and 54d serve further to provide passages for the forced pressurized lubricant to make its way between the plates for providing for lubricated free rotation of the sphere float thereon.

It is within the scope and spirit of the present invention to include or make such modification and substitution of equivalents as would be apparent to a person of ordinary skill in this art. For example, suitable ship-clutch gears and/or other conventional mechanisms may be employed, in manners for example as described in the parent patent applications.

I claim:

1. A wave-energy device comprising in combination: a lever means having a float-mounting portion thereof positioned uprightly; a float means mounted rotatably in a substantially horizontal plane on said float-mounting portion for free-roation there-around such that water current contact with the float means in a manner which would produce a torque thereon is rotatable of the float means thereby obviating twisting torque on the lever means; a mass means of predetermined dense mass sufficiently to impart a predetermined high degree of momentum to upward and downward actions of the lever means and the float means being adapted such that overall mass is substantially greater than for a float means devoid of excess mass, the float means being of predetermined water displacement volume sufficiently to negate by water displacement disproportionate weight of the mass means whereby the float is positioned in a partially submerged floating state; and said float means and said mass means jointly including mass-attaching means for mounting said mass to said float means.

2. The wave-energy device of claim 1, in which the mass-attaching means provides further for detachably mounting said mass means to said float means.

3. The wave-energy device of claim 1, including a pump means defining an elongated pump cylinder having an elongated piston-reciprocation space with the elongated piston-reciprocation space extending substantially coaxially with said lever means at an end of the cylinder positioned to be adjacent said lever means; a piston member mounted on the lever means for reciprocation within the elongated space of the cylinder means, the cylinder means being of a predetermined large length at least as great as a predetermined length of lever stroke of a lever means between crests and troughs of waves such that maximum pump stroke length is obtainable to thereby benefit from maximum momentum of maximum mass of pumped fluid per stroke; and inlet and outlet conduits having at least one end thereof attached operatively to the cylinder at at-least one end thereof, at least one end of the conduit being closed to define a compression space for effecting pump compression by the piston member for effecting liquid flow out of the outlet conduit, each of the inlet and outlet conduits' remaining opposite ends having mounted therebetween and thereon in closed circuit of flow a turbine means, the inlet and outlet conduits and the turbine means and the cylinder being arranged relative to one-another in a substantially circular-flow path shape such that substantially all times pumped liquid being channeled therethrough flows with a minimum of flow resistance and with a maximum benefit of momentum of flowing liquid.

4. The wave-energy device of claim 1, including a support structure having spaced apart upper and lower bearing means arranged operatively to support said lever with the lever extending in a substantially upright state and being reciprocatable through said upper and lower bearing means, the upper bearing means being positioned above said float means, the upper bearing means being mounted on an upper portion of a tower as a part of the support structure, and the lower bearing means being anchored fixedly within sea-bottom earth.

5. The wave-energy device of claim 1, in which said mass means is positioned at a location located about half-way between the top and bottom ends of the float means extending about horizontally substantially in the form of a disk.

6. The wave-energy device of claim 1, including a support structure having spaced apart upper and lower bearing means arranged operatively to support said lever with the lever extending in a substantially upright state and being reciprocatable through the upper and lower bearing means, the upper bearing means being positioned above said float means, and said lower bearing means being positioned below said float means, at least a part of said mass means being mounted on said lever means at a position beneath said lower bearing means.

7. The wave-energy device of claim 1, in which said float means is elongated in a substantially upright plane and is substantially oval shaped in an upright direction.

8. The wave-energy device of claim 7, in which said oval shape is of greater cross-section at an upper end thereof than at a lower end thereof.

9. The wave-energy device of claim 7, in which said oval shape is of greater cross-section at a lower end than at an upper end thereof.

10. The wave-energy device of claim 5, in which said mass means is an integral part of said float means and is elongated axially extending in an upright direction about parallel to said lever means.

11. The wave-energy device of claim 10, in which said mass means is substantially annular and is located at substantially an outerdiameter perimeter of said float means.

12. The wave-energy device of claim 1, in which said mass means comprises radially-extending spokes extending substantially laterally within space defined by the float means.

13. The wave-energy device of claim 3, in which each of opposite ends of the conduit are closed to define a compression space at each end on each of opposite side of the piston member, for effecting pump compression and liquid flow out of respective outlet conduits for cylinder opposite ends, said lever means extending axially throughout said cylinder means such that the lever means displaces an equal volume of space on each side of the piston member.

14. The wave-energy device of claim 1, in which said lever means and said mass means jointly include attaching-means for detachably mounting said mass onto said lever.

15. The wave-energy device of claim 14, in which said lever-attaching means includes lever structure for optionally attaching said mass at a plurality of alternate locations above and below said float means.

16. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacment volume sufficiently to negate by water displacement disproportionte weight of the mass means whereby the float is positioned in a partially submerged floating state, the float means including float-sinking means for alternately admitting and excluding liquid mass from water-displacement space within said float means; and said float means and said mass means jointly including mass-attaching means for mounting said mass to said float means.

17. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacement volume sufficiently to negate by water displacement disproportionate weight of the mass means whereby the float is positioned in a partially sumberged floating state, the float means including an interior space defined thereby and a port means for filling the space with closed cell foam.

18. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacement sufficiently to negate by water displacement disproportionate weight of the mass means whereby the float is positioned in a partially submerged floating state, the float means defining a lubrication channel and lubrication port means located on an exterior surface of the float means with the lubrication channel extending inwardly to a location at which the float means is revolvably mounted in juxtaposition to and on the lever means for providing pressurized lubrication thereto; and said float means and said mass means jointly including mass-attaching means for mounting said mass to said float means.

19. The wave-energy device of claim 18, including bearing means at said location for providing bearing rotation of the float means on the lever means.

20. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacement volume sufficiently to negate by water displacement disproportionate weight of the mass means whereby the float is positioned in a partially submerged floating state, said float means including upper and lower substantially hemispherically-shaped halve-portions separate from one-another and detachably secured to one-another in axial alignment of the vertical axis of each and including a detachable partition segregating upper inner space from lower iner space thereof; and said float means and said mass means jointly including mass-attaching means for mounting said mass to said float means.

21. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacement volume sufficiently to negate by water displacement disproportionate weight of the mass means whereby the float is positioned in a partially submerged floating state; said float means and said mass means jointly including mass-attaching means for mounting said mass to said float means; a support structure having spaced apart upper and lower bearing means arranged operatively to support said lever with the lever extending in a substantially upright state and being reciprocatable through said upper and lower bearing means, the upper bearing means being positioned above said float means, the upper bearing means being mounted on an upper portion of a tower as a part of the support structure and the lower bearing means being anchored fixedly within sea-bottom earth, the lower bearing means including an encasing vertically elongated cylinder including as a part thereof fluid pressure-relief means permitting liquid flow to and from the cylinder, a lower portion of said lever means extending coaxially within said cylinder and reciprocatable therewithin.

22. A wave-energy device comprising in combination: a lever means having a float-mounting portion thereof positioned uprightly; a float means mounted rotatably in a substantially horizontal plane on said float-mounting portion for free-rotation there-around such that water current contact with the float means in a manner which would produce a torque thereon is rotatable of the float means thereby obviating twisting torque on the lever means; a mass means of predetermined dense mass sufficiently to impart a predetermined high degree of momentum to each of to and fro actions of the lever means and the float means such that overall mass is substantially greater than for a float means devoid of excess mass, the float means being of predetermined water displacement volume sufficiently to negate by water displacement disproportionate weight of the mass means whereby the float is positioned in a partially submerged floating state, the float means including upper and lower substantially hemispherically-shaped halve portions separate from one-another and detachably secured to one-another in axial alignment of the vertical axis of each, said float means being elongated in all substantially horizontal directions in an upright plane and non-elongated in upright directions; and said float means and said mass means jointly including mass-attaching means for mounting said mass to said float means.

* * * * *